J. T. BROOKS.
INSECT DESTROYER.
APPLICATION FILED OCT. 10, 1914.

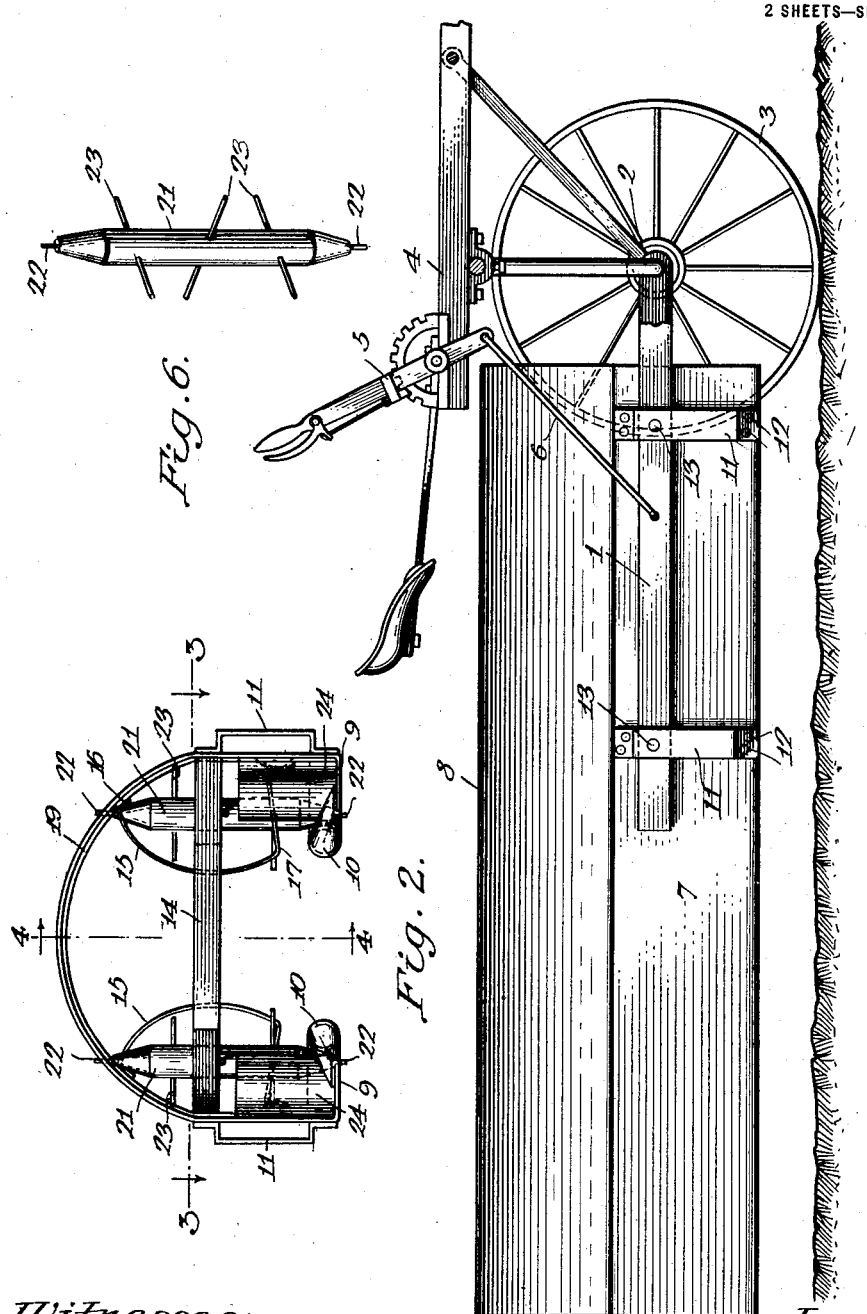

1,190,097.

Patented July 4, 1916.
2 SHEETS—SHEET 2.

Witnesses:

Inventor:
John T. Brooks
By his attys.

THE NORRIS PETERS CO., PHOTO-LITHO., WASHINGTON, D. C.

UNITED STATES PATENT OFFICE.

JOHN THOMAS BROOKS, OF CORPUS CHRISTI, TEXAS, ASSIGNOR OF ONE-HALF TO J. B. F. NEWTON, OF CORPUS CHRISTI, TEXAS.

INSECT-DESTROYER.

1,190,097.   Specification of Letters Patent.   Patented July 4, 1916.

Application filed October 10, 1914. Serial No. 866,079.

*To all whom it may concern:*

Be it known that I, JOHN T. BROOKS, a citizen of the United States of America, residing at Corpus Christi, in the county of Nueces and State of Texas, have invented certain new and useful Improvements in Insect-Destroyers, of which the following is a specification, reference being had therein to the accompanying drawing.

This invention relates to an insect destroyer and has for its principal object the production of a device which may be attached to a wheeled cultivator or some similar wheel conveyance whereby the same may be easily transported so as to engage and shake cotton bushes for causing the bugs and weevils to be knocked therefrom.

Another object of this invention is the production of an insect destroyer having a plurality of flat springs and a plurality of rotating spindles whereby when cotton bushes pass through the device the bolls will be freed from the bugs and weevils.

Still another object of this invention is the production of an insect destroyer having means for shaking the cotton bushes for causing the bugs thereon to be shaken therefrom and also provided with a plurality of shelves which are adapted to catch the bugs which are knocked from the bushes and then destroy the same.

With these and other objects in view this invention consists of certain novel combinations, constructions, and arrangements of parts as will be hereinafter fully described and claimed.

In the accompanying drawings:—

Figure 3:
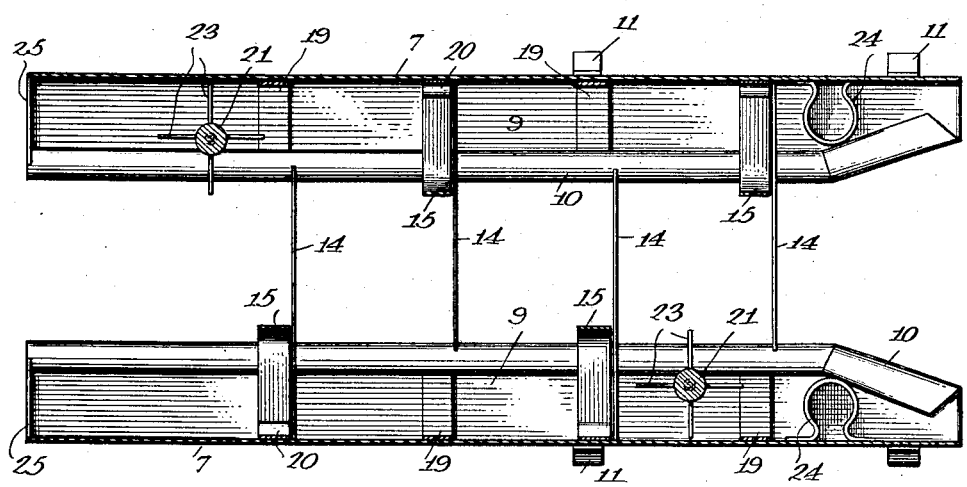
Figure 4:
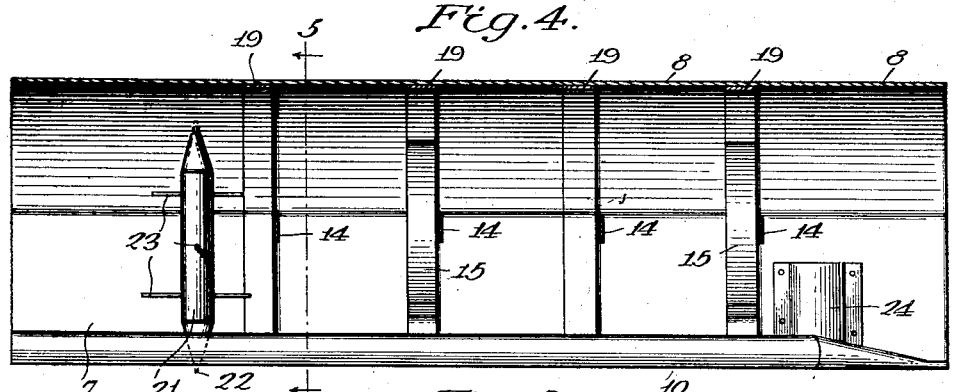
Figure 5:
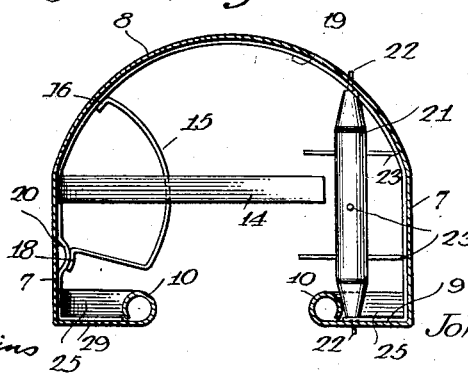

Figure 1 is a side elevation of the insect destroyer showing the same attached to a wheel support and in position for use. Fig. 2 is an end elevation of the insect destroyer. Fig. 3 is a section taken on the line 3—3 of Fig. 2 looking in the direction of the arrows. Fig. 4 is a section taken on the line 4—4 of Fig. 2 looking in the direction of the arrows. Fig. 5 is a section taken on the line 5—5 of Fig. 4 looking in the direction of the arrows. Fig. 6 is a detail view of the revolving spindle.

The present invention is adapted to be used in combination with a cultivator or other wheeled vehicle which has the side bars 1 supported upon the axle 2 carried by the wheels 3. This axle 2 is adapted to carry a beam 4 to which the adjusting lever 5 is pivotally supported. The link 6 is secured to one end of this lever 5 and also to the side bars 1 so that when desired the side bars may be raised or lowered thereby adjusting the insect destroyer carried thereon.

The insect destroyer comprises a hood-like body which is formed so as to constitute vertical side walls 7 and an integral curved top 8. These side walls 7 are bent inwardly at their lower ends to form the shelves 9 which extend at right angles to the walls 7. These shelves 9 terminate in the rolled sleeves 10 which extend longitudinally throughout the entire length of the shelves 9. The hanger brackets 11 are secured to the vertical side walls 7 by means of the rivets 12 so as to allow the bars 1 to extend therethrough for supporting the insect destroyer at a spaced distance above the ground. Pins 13 may be passed through the brackets 11 and also through the bars 1 so as to retain the insect destroyer in its correct position upon the bars. It will be seen that by rocking the lever 5 the link 6 will swing the bars 1 thereby raising or lowering the insect destroyer as desired.

By referring particularly to Fig. 3 it will be seen that the forward end of the shelves 9 have their rolled edge portions diverging so as to form an enlarged entrance opening whereby the cotton bushes may be easily directed within the insect destroyer and between the sleeves 10.

For the purpose of knocking the bugs or weevils from the cotton bushes a plurality of flat springs are fixedly carried within the hood for engaging and shaking the cotton bushes as the same pass therethrough. Each flat spring 14 has one end thereof soldered or otherwise secured to one of the side walls 7. The spring then extends from the side wall to which it is secured to a point above the rolled portion 10 of the shelf 9 of the opposite side wall. A number of these springs are provided and are positioned in staggered relation to each other as will be seen by referring to Fig. 3. In order to reinforce these springs 14 a plurality of reinforcing frames 15 are carried within the hood so as to be permanently secured adjacent the fixed end of each spring 14. Each of these frames is formed of a single strip of material and is bowed so as to terminate at one end in an angular lip 16 having at the opposite end a finger 17 which terminates in the curved lip 18. The side walls and hood are provided with reinforcing bands 19 having their end portions resting upon the shelves 9 as shown in Fig. 5. Each band 19 is provided with a bulged portion 20 upon which one of the lips 18 is adapted to be secured. The angular lip 16 of each frame 15 is also secured to the portion of the band 19 carried by the top portion 8 of the hood. After a cotton bush passes into the hood it will strike upon the first spring 14 and as it passes the springs the frames 15 will limit the pivotal movement of the springs and thereby prevent the same from being broken from engagement with the side walls of the hood.

Each shelf 9 carries a revolving spindle 21 having the pins 22 extending from its end portions. These pins 22 are adapted to be journaled in the shelves 9 and the top 8 of the hood. The rods 23 extend transversely through the spindles 21 so as to engage the cotton bushes when the same pass through the hood. As the cotton bushes pass through the hood and are engaged by the springs 14 and the rods 23 of the spindles the bushes will be shaken and knocked so as to knock or jar the bugs and weevils therefrom. Since the free ends of the springs extend to a point above the rolled portion 10 of the opposite side of the hood, when the bush is shaken it will be hanging over one of the shelves 9 and therefore this particular shelf will catch the bugs or weevils knocked therefrom.

In order to kill and thus exterminate the bugs, worms or weevils caught by this destroyer a tank 24 is fixedly secured to the side walls of the hood so as to allow one tank to be carried by each shelf 9. Within these tanks sulfur, alcohol or other suitable substance may be burned so as to heat the interior of the hood. By heating the hood it will be seen that when the bugs fall upon the shelves they will be killed by reason of the heat owing to the shelves 9 being heated by the burning of the contents of the tanks 24. It will also be noted that the flanges 25 are carried by the rear end portions of the frame so as to span the distance between the side walls 7 and the rolled sleeves 10. In this manner it will be seen that the sleeves 10 and flanges 25 will retain the bugs upon the shelves while the same are being destroyed.

When this device is in use it is attached to the side bars 1 of the vehicle. The sulfur, alcohol or other combustible material may be positioned within the tanks 24 at which time the contents within the tank may be ignited. The heat from these burning contents will of course heat the shelves 9. As the vehicle moves forwardly it will draw the insect destroyer thereafter, holding the insect destroyer at a spaced distance above the ground. The cotton bushes are passed between the wheels of the vehicle and will be passed into the hood. As the bushes are engaged by the flat springs 14 and the rods 23 of the revolving spindles they will be shoved to one side and shaken so as to cause the bugs to be knocked therefrom. As the bugs or worms fall upon the shelves the heat of the shelves will destroy the same. It is of course obvious that whenever desired the insect destroyer may be removed from the side bars 1 and may be adjusted when in use.

From the foregoing description it will be seen that a simple and efficient insect destroyer has been produced which will quickly and easily engage cotton bushes and shake the same so as to free the same from bugs, worms or weevils at which time the bugs may be destroyed, this device being adapted to retain the bugs or weevils and prevent the same from falling or returning to the cotton bushes.

What I claim is:—

1. In an insect destroyer of the class described, the combination of a one piece hood, said hood being formed from a blank and comprising a body semi-circular in cross section having inwardly extending shelves formed integral upon its lower portions and extending at right angles thereto, said shelves having longitudinally extending rolled sleeves upon their inner portions, means carried by said shelves for shaking bushes passing therebetween, whereby insects which are shaken from the bushes will fall upon said shelves, said sleeves preventing the insects from escaping and also preventing said shelves from injuring the bushes, and means for supporting said hood.

2. In an insect destroyer of the class described the combination of a one-piece hood, said hood being formed from a blank so as to have a closed upper portion, and terminating at its lower portions in inwardly extending shelves having rolled sleeves, flat spring beaters positioned within said hood, each spring having one end thereof fixedly secured upon said hood, whereby the springs may swing so as to beat or shake the bushes passing through said hood for removing insects from the bushes, said shelves being adapted to catch the insects, means for limiting the swing of said flat springs in one direction, whereby the springs are prevented from breaking off, and means for supporting said hood.

3. In an insect destroyer of the class described, the combination of a one-piece hood, said hood being formed from a blank and comprising a body semi-circular in cross-section having inwardly extending shelves formed integral upon the lower portions thereof and extending at right angles thereto, said shelves having longitudinally extending rolled sleeves upon their inner portions, a plurality of flat spring beaters fixedly secured at their ends within said hood, reinforcing frames fixedly secured within said hood and having their central portions carried at a spaced distance from the inner surfaces of said hood, said frames carried adjacent said spring beaters whereby said springs may shake a bush passing through said hood for shaking insects therefrom, said shelves being adapted to catch the insects, said frames limiting the swinging of said spring beaters in one direction thereby preventing the springs from breaking from engagement with said hood, and means for supporting said hood.

4. In an insect destroyer of the class described, the combination of a supporting hood, insect catching means carried by said hood, means for supporting said hood, reinforcing bands fixedly mounted within said hood and conforming in shape to the contour thereof for strengthening said hood, outwardly-bowed reinforcing frames positioned within said hood, said frames provided with feet, said feet being fixedly secured upon said bands, whereby the major portions of said frames will be carried at a distance from the inner portions of said hood, and resilient elongated beaters fixedly mounted within said hood, said beaters being adapted to normally bear against the central portions of said frames, said beaters being adapted to shake bushes passing through said hood, whereby insects may be shaken onto said insect catching means, said frames being adapted to limit the swinging movement of said beaters in one direction, whereby the beaters will be prevented from breaking from engagement with said hood.

In testimony whereof I hereunto affix my signature in presence of two witnesses.

JOHN THOMAS BROOKS.

Witnesses:
P. L. TOWNES,
S. T. BRYANT.

Copies of this patent may be obtained for five cents each, by addressing the "Commissioner of Patents, Washington, D. C."